United States Patent
Chang

(10) Patent No.: US 7,957,631 B2
(45) Date of Patent: Jun. 7, 2011

(54) IMAGE STABILIZATION APPARATUS FOR STABILIZING AN IMAGE SENSOR

(75) Inventor: Kun-Rong Chang, Hsinchu (TW)

(73) Assignee: Coretronic Corporation, Hsinchu Science Park, Hsin-Chu (TW)

( * ) Notice: Subject to any disclaimer, the term of this patent is extended or adjusted under 35 U.S.C. 154(b) by 664 days.

(21) Appl. No.: 12/025,782

(22) Filed: Feb. 5, 2008

(65) Prior Publication Data
US 2008/0260368 A1 Oct. 23, 2008

(30) Foreign Application Priority Data
Apr. 18, 2007 (TW) ................. 96113666 A

(51) Int. Cl.
- G03B 17/00 (2006.01)
- H04N 5/228 (2006.01)
- G02B 27/64 (2006.01)
- H02K 1/22 (2006.01)
- H02K 1/12 (2006.01)

(52) U.S. Cl. ............ 396/55; 348/208.1; 348/208.4; 348/208.7; 359/554; 310/254.1; 310/261.1

(58) Field of Classification Search .......... 396/55, 396/52; 348/208.99, 208.1, 208.2, 208.4, 348/208.5, 208.7, 208.11; 359/554, 557; 310/35, 46, 49 R, 154.02, 194, 208, 254, 310/259, 261, 261.1, 254.1
See application file for complete search history.

(56) References Cited

U.S. PATENT DOCUMENTS

| | | | |
|---|---|---|---|
| 5,155,520 A | 10/1992 | Nagasaki et al. | |
| 5,745,802 A | 4/1998 | Imura | |
| 5,781,806 A | 7/1998 | Satoh et al. | |
| 5,973,319 A | 10/1999 | Washisu | |
| 5,974,268 A | 10/1999 | Washisu | |
| 6,097,896 A | 8/2000 | Usui | |
| 6,130,993 A | 10/2000 | Hayakawa | |
| 6,870,306 B2 * | 3/2005 | Ajioka | 310/367 |
| 6,992,700 B1 | 1/2006 | Sato et al. | |
| 2005/0276588 A1 | 12/2005 | Tsutsumi | |

FOREIGN PATENT DOCUMENTS

| | | |
|---|---|---|
| JP | 2005184122 | 7/2005 |
| TW | 200630741 | 9/2006 |
| TW | 200638153 | 11/2006 |
| TW | 200643604 | 12/2006 |
| TW | 200715837 | 4/2007 |

* cited by examiner

Primary Examiner — Rochelle-Ann J Blackman
(74) Attorney, Agent, or Firm — Winston Hsu; Scott Margo

(57) ABSTRACT

An image stabilization apparatus for stabilizing an image sensor is disclosed. The image stabilization apparatus includes a transmission component whereon a slot is formed. The image stabilization apparatus further includes a rotary motor including an annular rotor connected to the transmission component, and an annular stator disposed on a side of the annular rotor. The annular rotor is capable of rotating relative to the annular stator. The image stabilization apparatus further includes a carrier for carrying the image sensor. The carrier includes a shaft disposed inside the slot in a slidable manner. The image stabilization apparatus further includes a linear motor coupled to the transmission component and the shaft of the carrier for driving the carrier to slide inside the slot.

15 Claims, 10 Drawing Sheets

IMAGE STABILIZATION APPARATUS FOR STABILIZING AN IMAGE SENSOR

BACKGROUND OF THE INVENTION

1. Field of the Invention

The present invention relates to an image stabilization apparatus, and more particularly, to an image stabilization apparatus for stabilizing an image sensor by sensing a horizontal displacement and a vertical displacement of the image sensor and calculating correction values.

2. Description of the Prior Art

Image capturing devices trend for small size and lightweight for convenient carry recently so that it is not easy to hold the image capturing devices with hands stably and the image quality of photographing is affected. In general, the digital camera utilizes the optical anti-vibration mechanism or the digital anti-vibration mechanism for correcting blurred images due to shock of hands. The optical anti-vibration mechanism moves the lens or the image sensor in a horizontal direction or in a vertical direction opposite to a direction of vibration for correcting the blurred images. The digital anti-vibration mechanism utilizes an algorithm and an image processing method for correcting the blurred images.

Please refer to FIG. 1 and FIG. 2. FIG. 1 is a functional block diagram of an image capturing device 10 in the prior art. FIG. 2 is a diagram of the image capturing device 10 in the prior art. The image capturing device 10 may be a digital camera, a digital video recorder, and so on. The image capturing device 10 includes an image sensor 12 for transforming light received by a projection lens of the image capturing device 10 into electrical signals. The image sensor 12 may include a charge coupled device (CCD) or a complementary metal-oxide semiconductor (CMOS). The image capturing device 10 further includes a carrier 14 for carrying the image sensor 12, a horizontal sensor 16 for sensing a horizontal displacement in a X direction of the carrier 14, a vertical sensor 18 for sensing a vertical displacement in a Y direction of the carrier 14, a horizontal magnetic means 20 for driving the carrier 14 to move in the X direction, a vertical magnetic means 22 for driving the carrier 14 to move in the Y direction, and a control unit 26 for controlling the horizontal magnetic means 20 and the vertical magnetic means 22 to drive the carrier 14 according to the horizontal displacement sensed by the horizontal sensor 16 and the vertical displacement sensed by the vertical sensor 18 so as to correct the displacement of the image sensor 12 due to the shock of the image capturing device 10. The image capturing device 10 in the prior art utilizes the horizontal magnetic means 20 and the vertical magnetic means 22 to correct the displacement of the carrier 14 on X-Y plane due to the shock of hands. However these magnetic driving means, the horizontal magnetic means 20 and the vertical magnetic means 22, have a problem of residual magnetic force.

SUMMARY OF THE INVENTION

An image stabilization apparatus according to an embodiment of the present invention to stabilize an image sensor for solving the above-mentioned problem is provided.

According to an embodiment of the claimed invention, an image stabilization apparatus for stabilizing an image sensor is disclosed. The image stabilization apparatus includes a transmission component whereon a slot is formed. The image stabilization apparatus further includes a rotary motor with an annular rotor connected to the transmission component, and an annular stator disposed on a side of the annular rotor. The annular rotor is capable of rotating relative to the annular stator. The image stabilization apparatus further includes a carrier for carrying the image sensor. The carrier includes a shaft disposed inside the slot in a slidable manner. The image stabilization apparatus further includes a linear motor coupled to the transmission component and the shaft of the carrier for driving the carrier to slide inside the slot.

Other objectives, features and advantages of the present invention will be further understood from the further technology features disclosed by the present invention wherein there are shown and described preferred embodiments of this invention, simply by way of illustration of modes best suited to carry out the invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
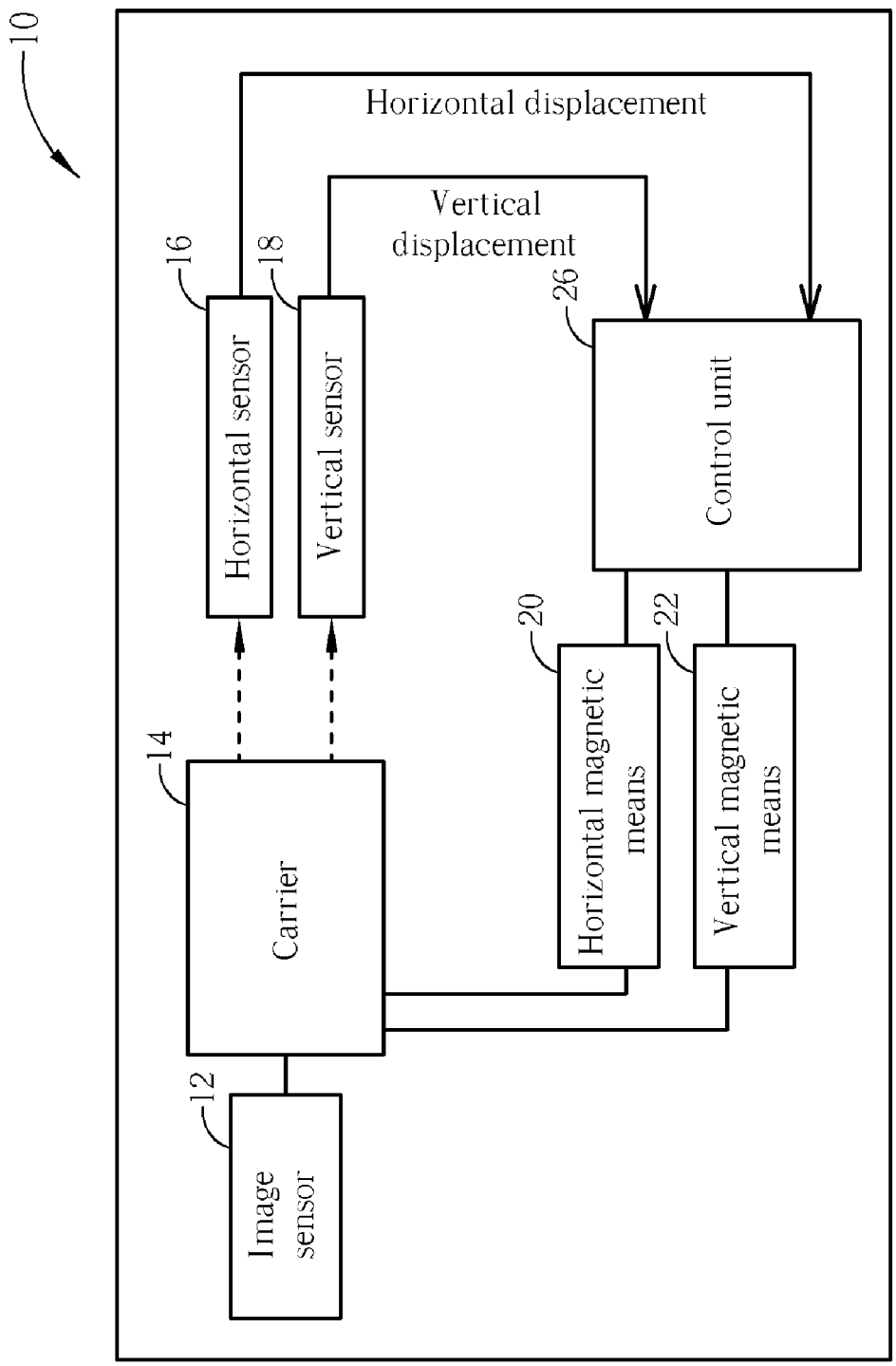
FIG. 1 is a functional block diagram of an image capturing device in the prior art.
Figure 2:
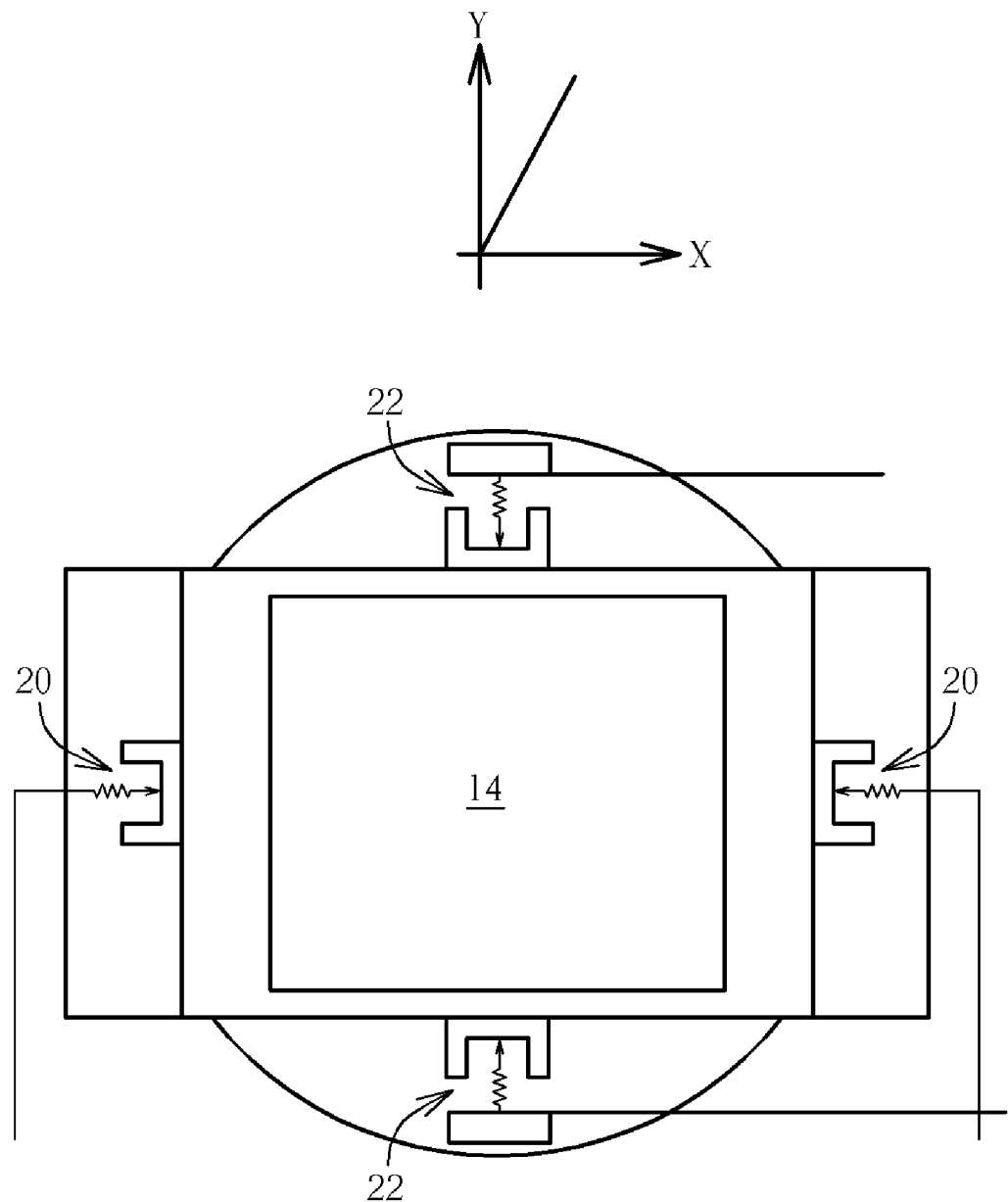
FIG. 2 is a schematic diagram of the image capturing device using optical anti-vibration mechanism in the prior art.
Figure 3:
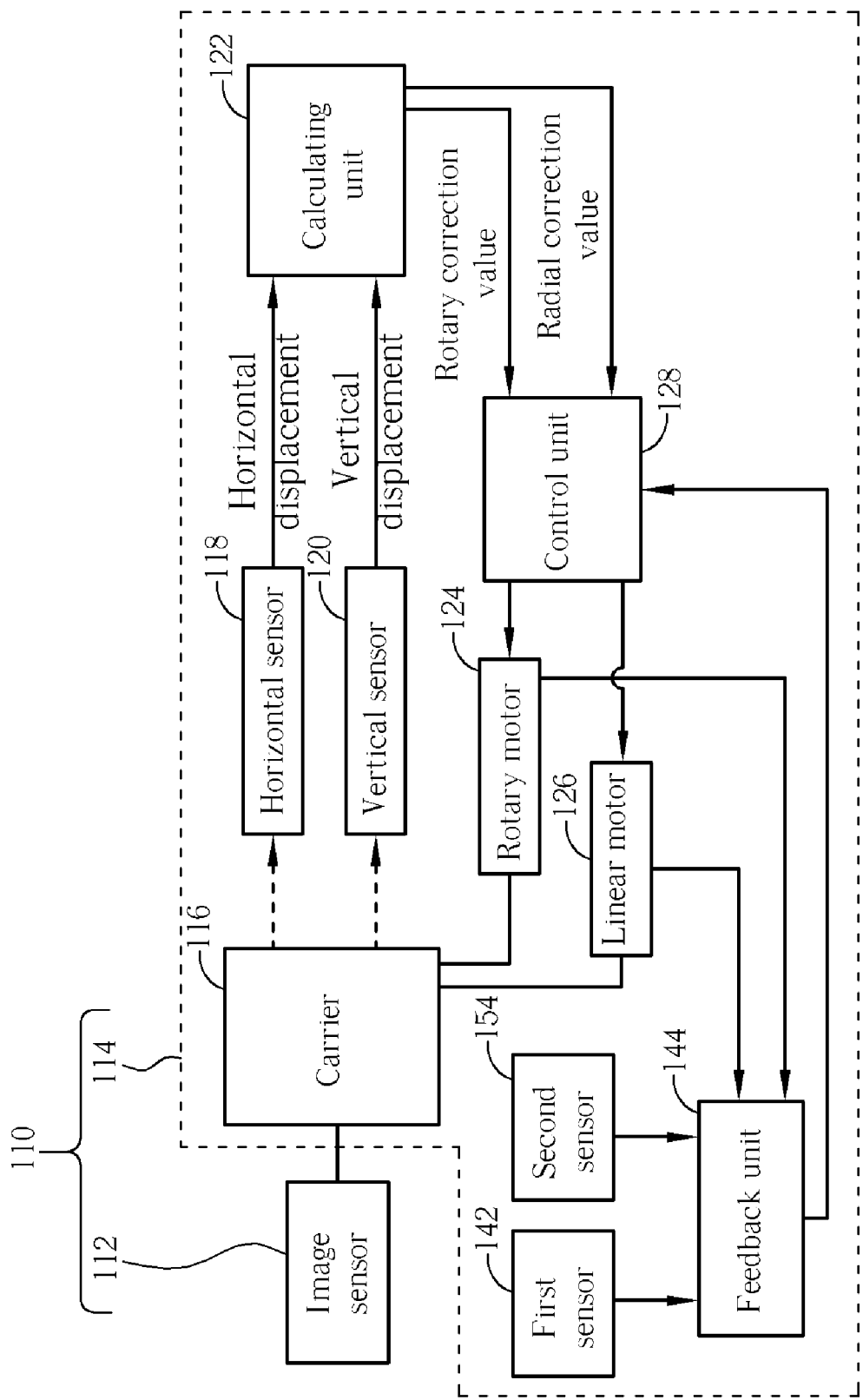
FIG. 3 is a functional block diagram of an image capturing device according to a preferred embodiment of the present invention.

Please refer to FIG. 3. FIG. 3 is a functional block diagram of an image capturing device 110 according to a preferred embodiment of the present invention. The image capturing device 110 may be a digital camera, a digital video recorder, and so on. The image capturing device 110 includes an image sensor 112 for transforming light received by a lens of the image capturing device 10 into electrical signals. The image sensor 112 may be a charge coupled device (CCD) or a complementary metal-oxide semiconductor (CMOS). The image capturing device 110 further includes an image stabilization apparatus 114 for stabilizing the image sensor 112, that is, for correcting the displacement of the image sensor 112 due to the hand shock or any other shock of the image capturing device 110. The image stabilization apparatus 114 includes a carrier 116 for carrying the image sensor 112, a horizontal sensor 118 for sensing a horizontal displacement of the carrier 116, a vertical sensor 120 for sensing a vertical displacement of the carrier 116, a calculating unit 122 for calculating a rotary correction value and a radial correction value according to the horizontal displacement and the vertical displacement, a rotary motor 124, a linear motor 126, and a control unit 128 coupled to the calculating unit 122 for controlling the rotary motor 124 and the linear motor 126 according to the rotary correction value and the radial correction value.

Figure 4:
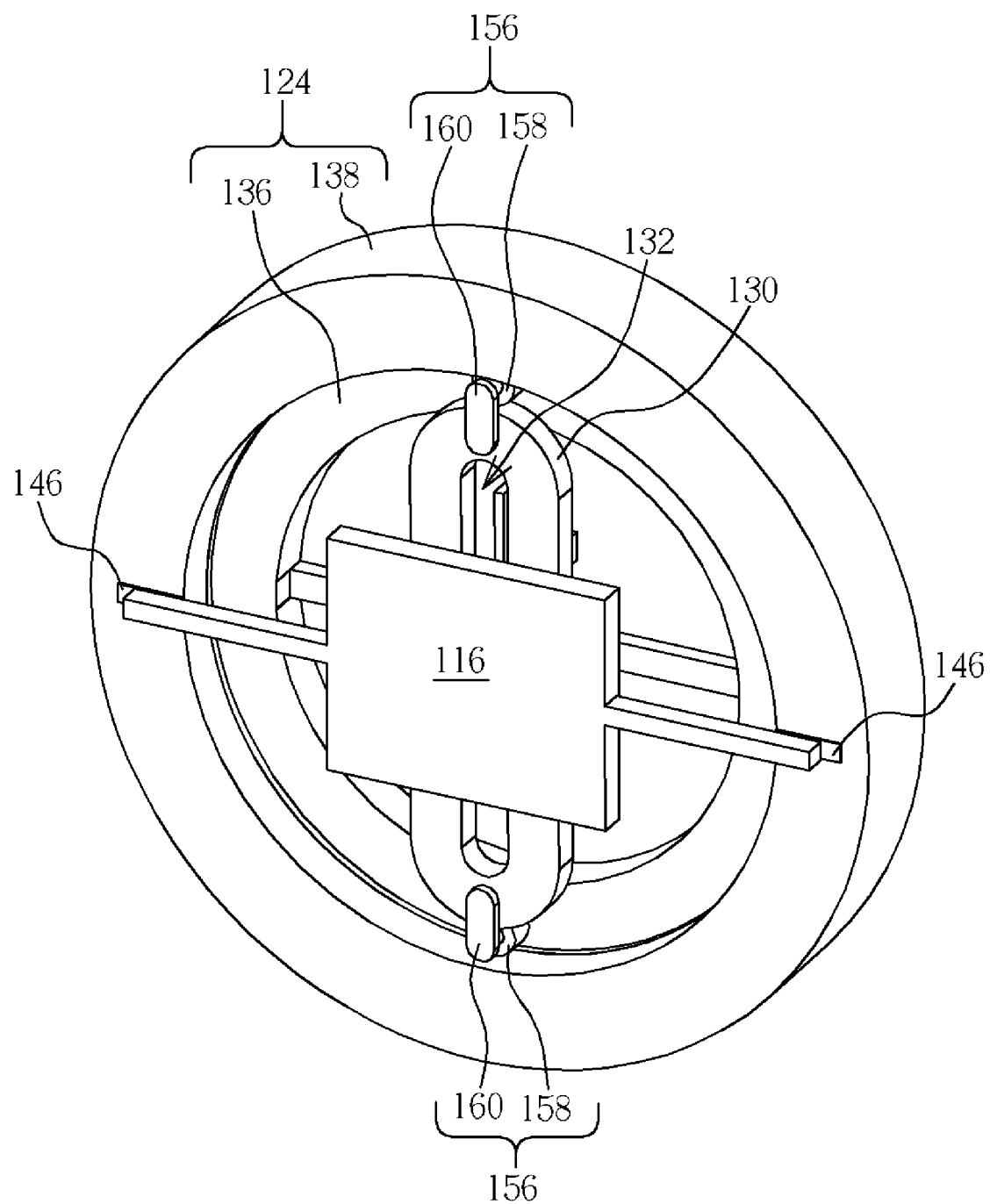
FIG. 4 and FIG. 5 are schematic drawings of an image stabilization apparatus according to the preferred embodiment of the present invention.
Figure 5:
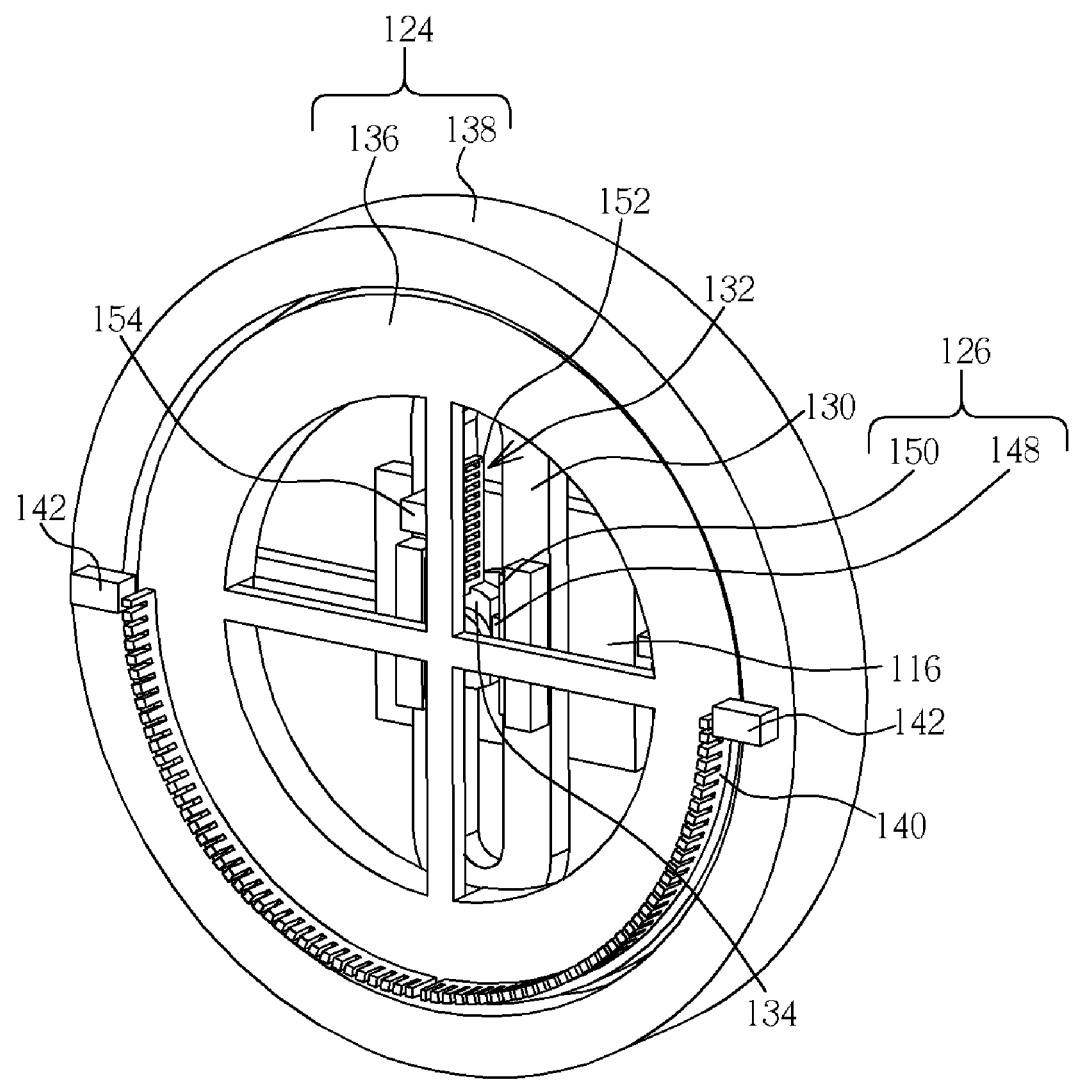
Figure 6:
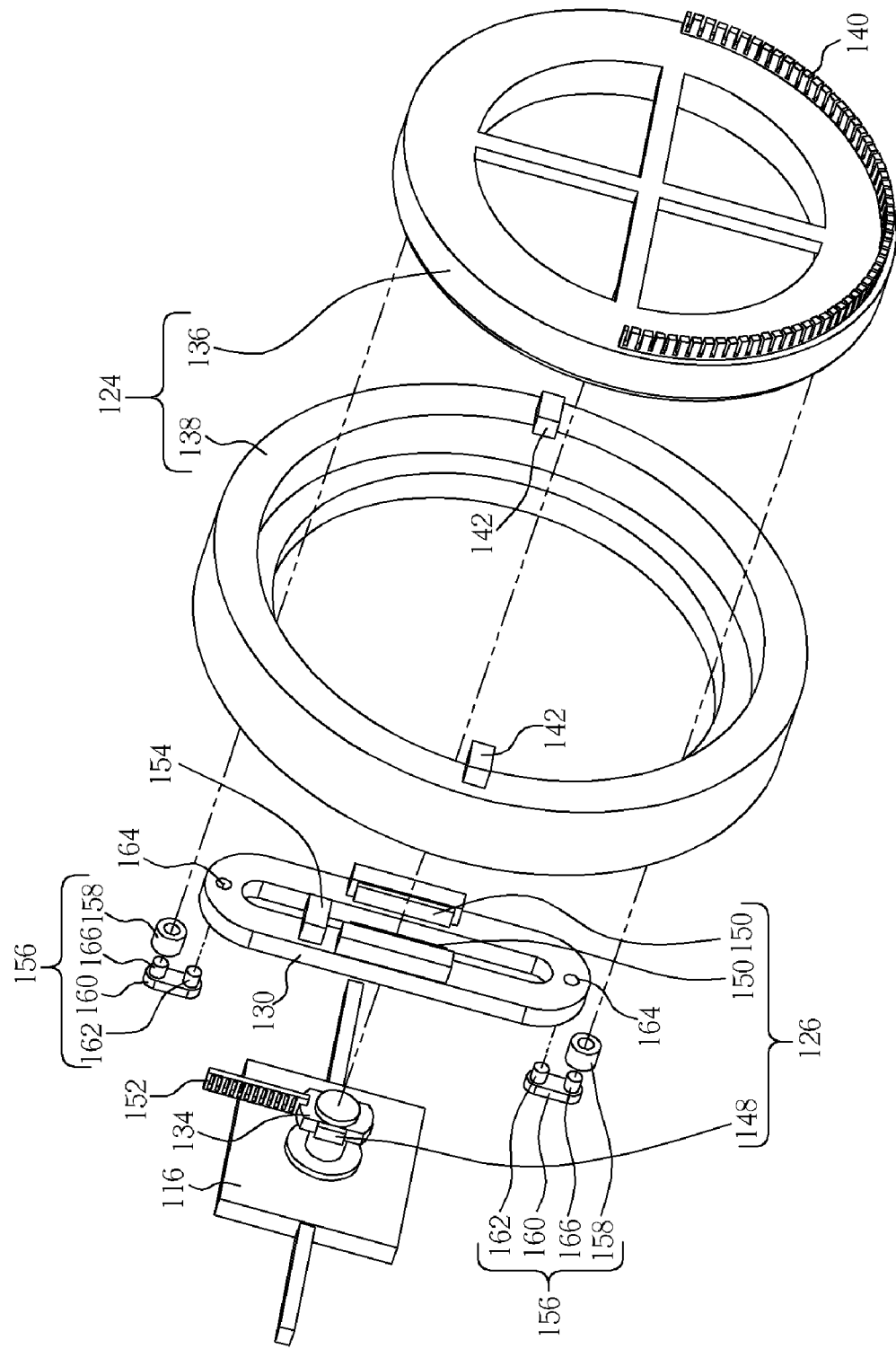
FIG. 6 and FIG. 7 are exploded diagrams of the image stabilization apparatus according to the preferred embodiment of the present invention.
Figure 7:
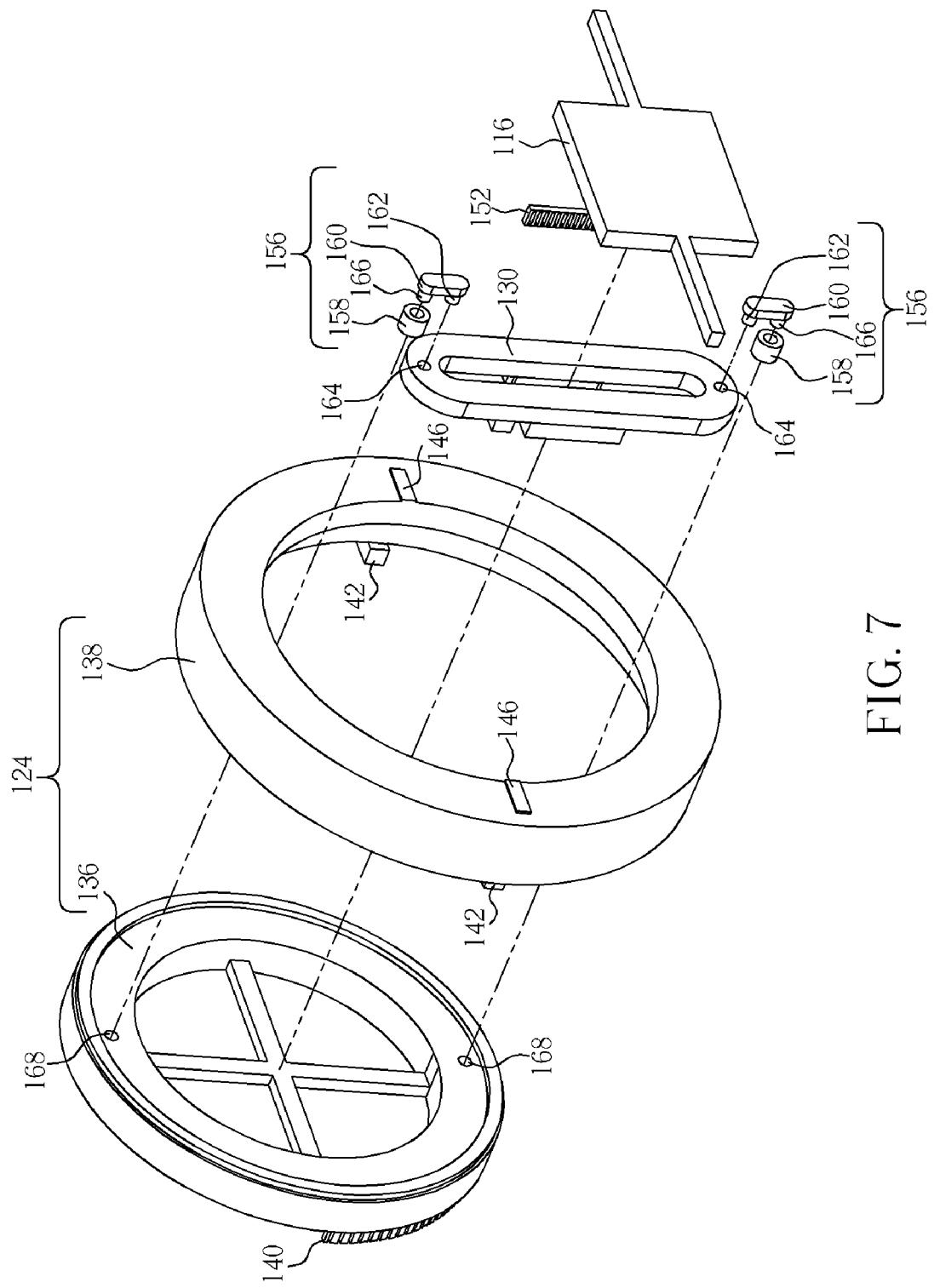
Figure 8:
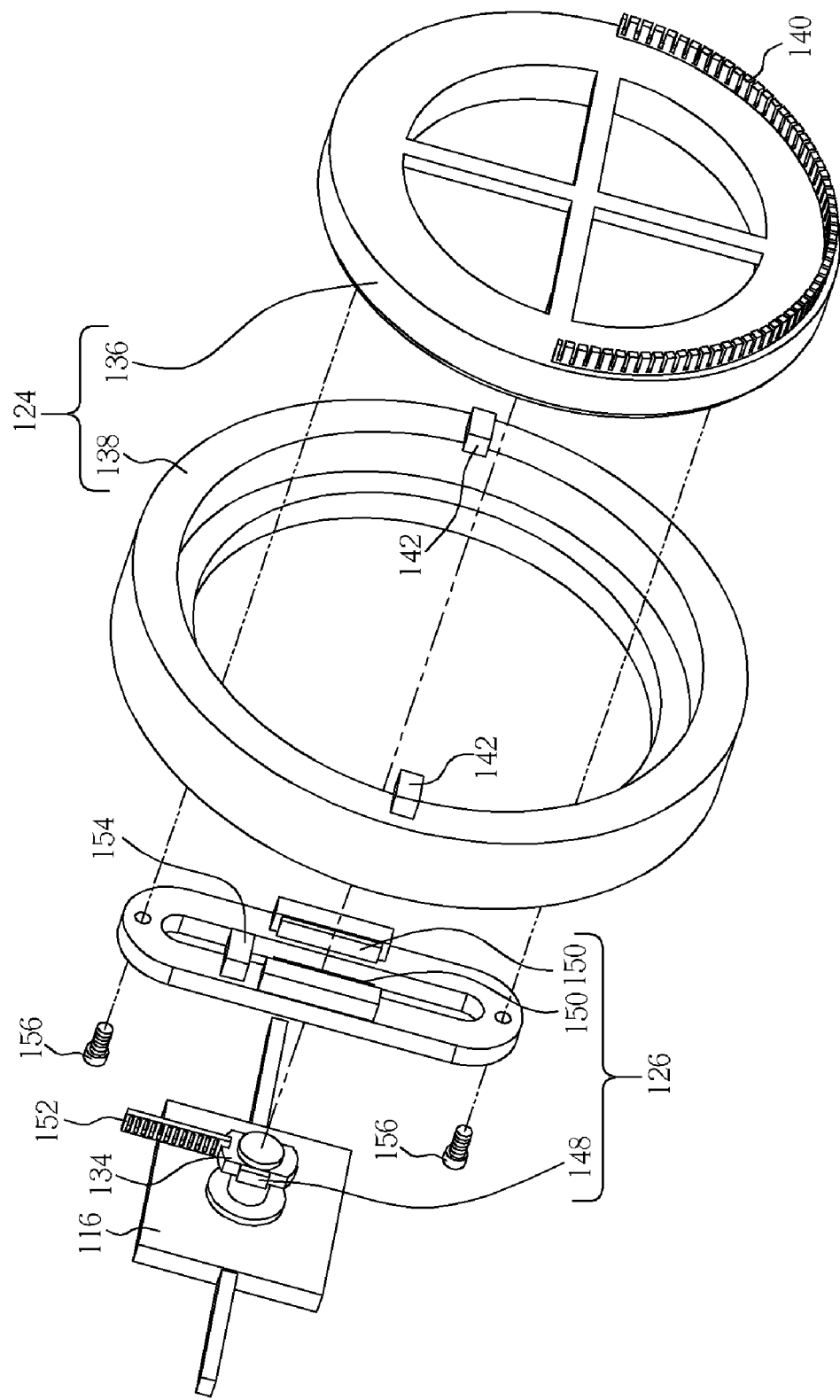
FIG. 8 is an exploded diagram of the image stabilization apparatus according to another preferred embodiment of the present invention.

Please refer to FIG. 4 to FIG. 7. FIG. 4 and FIG. 5 are schematic drawings of the image stabilization apparatus 114 according to the preferred embodiment of the present invention. FIG. 6 and FIG. 7 are exploded diagrams of the image stabilization apparatus 114 according to the preferred embodiment of the present invention. The image stabilization apparatus 114 further includes a transmission component 130 whereon a slot 132 is formed. The carrier 116 includes a shaft 134 disposed inside the slot 132 in a slidable manner relative to the transmission component 130. The rotary motor 124 is a supersonic rotary motor with characteristics of small size and rapid rotary speed. The rotary motor 124 further includes an annular rotor 136, and an annular stator 138. Two sides of the transmission component 130 are connected to the annular rotor 136. The annular stator 138 is disposed outside of the annular rotor 136 or is disposed inside of the annular rotor 136 for driving the annular rotor 136 to rotate. The annular stator 138 is made of piezoelectric material to drive the annular rotor 136 to rotate by frictional force caused by the waveform swinging of the annular stator 138 receiving voltage. The image stabilization apparatus 114 further includes at least two fixing components 156 for connecting the transmission component 130 and the annular rotor 136. Each fixing component 156 includes a sheath 158 disposed on an end of the transmission component 130 and inside the annular stator 138, a plate 160, a first protrusion 162 disposed on the plate 160 for inserting inside a hole 164 on an end of the transmission component 130, and a second protrusion 166 disposed on the plate 160 for passing through the sheath 158 and inserting inside a hole 168 on the annular rotor 136. When the annular rotor 136 rotates relative to the annular stator 138, the annular rotor 136 drives the transmission component 130 to rotate and the sheath 158 contacting with the inner side of the annular stator 138 and an end of the transmission component 130 rotates accordingly so as to position the rotation values of the transmission component 130 accurately. Please refer to FIG. 8. FIG. 8 is an exploded diagram of the image stabilization apparatus 114 according to another preferred embodiment of the present invention. The fixing component 156 is a screw which differs from the above-mentioned embodiment for screwing the transmission component 130 and the annular rotor 136 in this embodiment. When the annular rotor 136 rotates relative to the annular stator 138, the annular rotor 136 drives the transmission component 130 to rotate.

The image stabilization apparatus 114 further includes a dial 140 disposed on the annular rotor 136, and at least one first sensor 142 installed on the annular stator 138 and located in a position corresponding to the dial 140 for sensing a rotary displacement of the dial 140. Please refer to FIG. 3, the image stabilization apparatus 114 further includes a feedback unit 144 for comparing a signal transmitted from the rotary motor 124 and a signal transmitted from the first sensor 142 so as to generate a first feedback signal. The control unit 128 controls the rotary motor 124 according to the first feedback signal. The image stabilization apparatus 114 further includes a positioning component 146 disposed on the annular stator 138 for positioning the carrier 116 in an initial location or for detecting whether the carrier 116 is positioned in an initial location. That is, the positioning component 146 is for positioning the carrier 116 in the location without correction of the image stabilization apparatus 114. The positioning component 146 may be a magnet for magnetizing the carrier 116 so as to prevent the carrier 116 from moving due to rotary inertia.

Moreover, the linear motor 126 may be a supersonic linear motor with characteristics of small size and rapid moving speed. The linear motor 126 includes at least one linear slider 148 sheathed outside the shaft 134 of the carrier 116, and a linear stator 150 installed on a side of the slot 132 of the transmission component 130 for driving the linear slider 148 to slide inside the slot 132. The linear stator 150 is made of piezoelectric material to drive the linear slider 148 to slide by frictional force caused by the waveform swinging of the annular stator 138 receiving voltage. The image stabilization apparatus 114 further includes a scale 152 disposed on the linear slider 148, and at least one second sensor 154 installed on the linear stator 150 and located in a position corresponding to the scale 152 for sensing a linear displacement of the scale 152. Please refer to FIG. 3, the feedback unit 144 of the image stabilization apparatus 114 is for comparing a signal transmitted from the linear motor 126 with a signal transmitted from the second sensor 154 so as to generate a second feedback signal. The control unit 128 controls the linear motor 126 according to the second feedback signal.

Figure 9:
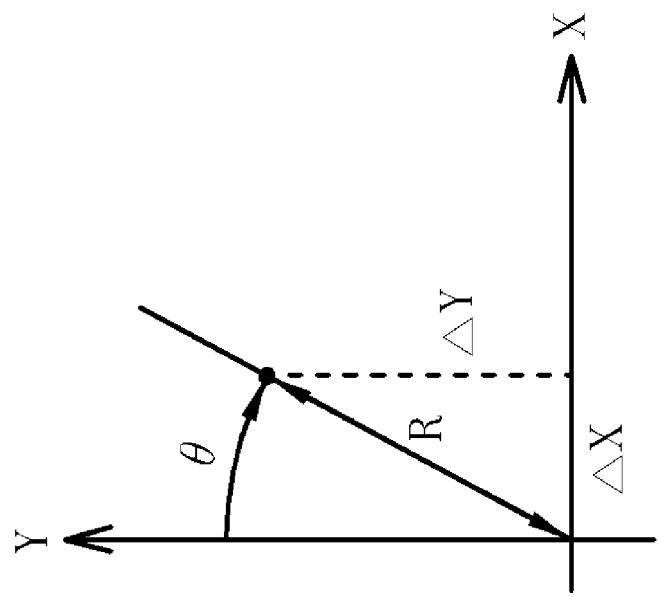
FIG. 9 is a transformation relation of Cartesian Coordinates System and Polar Coordinates System.
Figure 9:
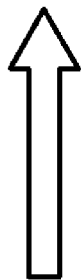
Figure 9:
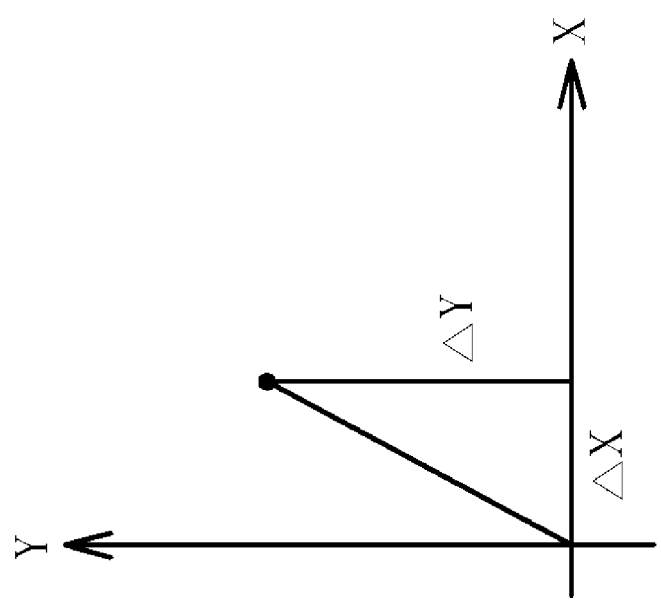

The horizontal sensor 118 and the vertical sensor 120 sense the horizontal displacement in the X direction and the vertical displacement in the Y direction of the carrier 116 respectively due to the shock of hands. Then the calculating unit 122 calculates the rotary correction value and the radial correction value according to the horizontal displacement and the vertical displacement. Please refer to FIG. 9. FIG. 9 is a transformation relation of Cartesian Coordinates System and Polar Coordinates System. The transformation relation of Cartesian Coordinates System and Polar Coordinates System is:

$$\theta = \tan^{-1}\left(\frac{\Delta X}{\Delta Y}\right)$$

$$R = \sqrt{\Delta X^2 + \Delta Y^2}$$

The transformation relation of the horizontal displacement, the vertical displacement and the rotary correction value, radial correction value referring to the above transformation relation is:

$$\text{the rotary correction value} = \tan^{-1}\left(\frac{\text{the horizontal displacement}}{\text{the verticle displacement}}\right)$$

$$\text{the radial correction value} = \sqrt{(\text{the horizontal displacement})^2 + (\text{the verticle displacement})^2}$$

Figure 10:
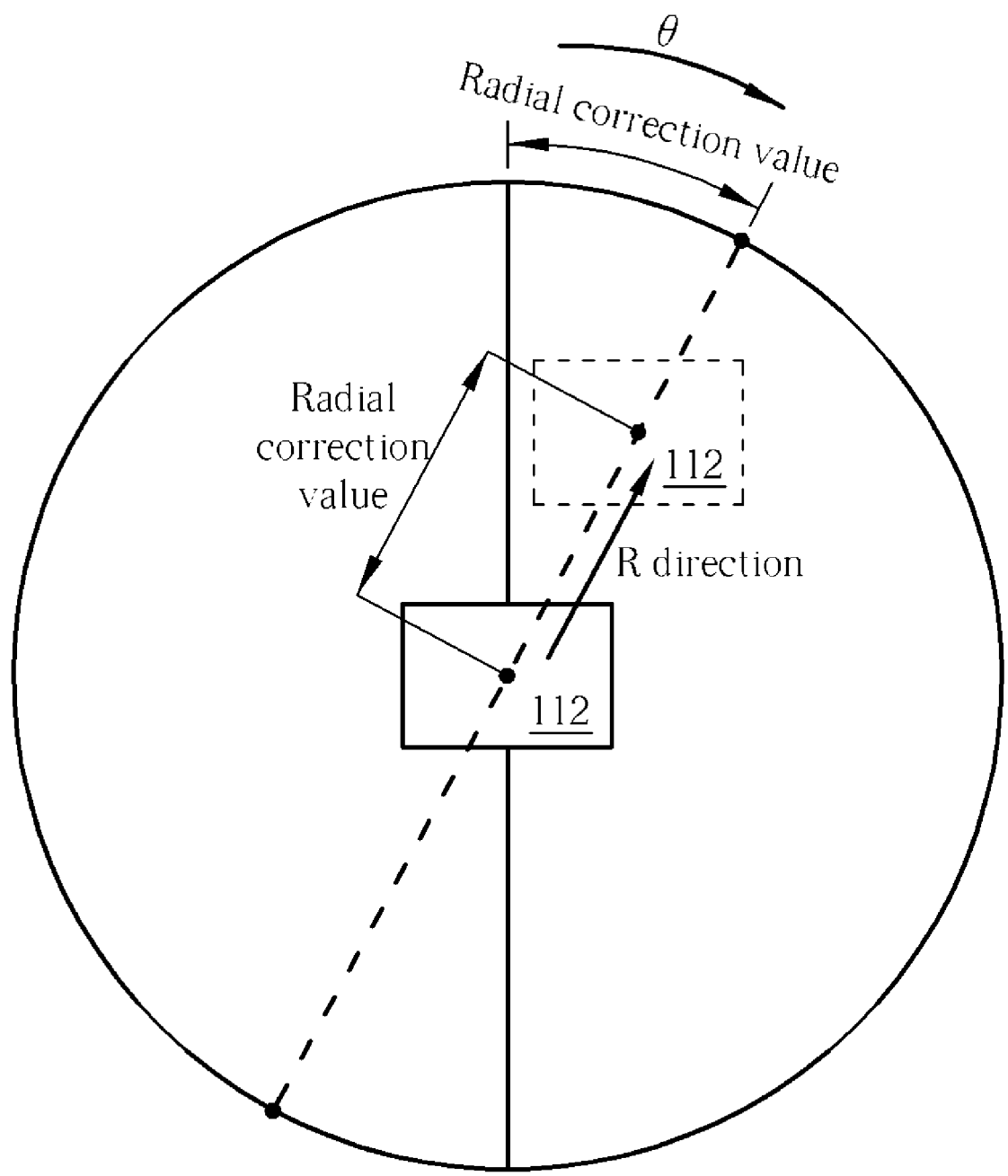
FIG. 10 is a schematic diagram of correcting an image sensor to move at a rotary correction value and a radial correction value according to an embodiment of the present invention.

The control unit 128 controls the rotary motor 124 and the linear motor 126 to drive the carrier 116 to move in the rotary correction value and the radial correction value so as to correct the bias of the image sensor 112 due to the horizontal displacement and the vertical displacement of the image capturing device 110. Please refer to FIG. 10. FIG. 10 is a schematic diagram of correcting the image sensor 112 to move at the rotary correction value and the radial correction value according to an embodiment of the present invention. The image sensor 112 rotates at the rotary correction value in a peripheral direction of the rotary motor 124 and move at the radial correction value in a radial direction so that the image sensor 112 moves at the horizontal displacement in the X direction and at the vertical displacement in the Y direction oppositely on the X-Y plane for correcting the bias of the image sensor 112 due to the horizontal displacement and the vertical displacement of the image capturing device 110.

After the rotary motor 124 and the linear motor 126 drive the carrier 116 to move at the rotary correction value and at the radial correction value oppositely for correcting the bias of the image sensor 112, the first sensor 142 senses the rotary displacement of the dial 140 on the annular rotor 136. There is a plurality of graduations on the dial 140. The first sensor 142 senses how many graduations the rotary displacement of the dial 140 corresponds to and then output a corresponding signal to the feedback unit 144. The feedback unit 144 compares the rotary displacement of the dial 140 according to the graduations of the dial 140 with the rotary correction value of the carrier 116 driven by the rotary motor 124. If the rotary displacement of the dial 140 corresponds with the rotary correction value of the carrier 116, there is no need to correct the rotary motor 124 anymore. If the rotary displacement of the dial 140 does not correspond with the rotary correction value of the carrier 116, the feedback unit 144 outputs the first feedback signal to the control unit 128 and thus the control unit 128 controls the rotary motor 124 according to the first feedback signal. That is, the control unit 128 controls the rotary motor 124 according to the difference between the rotary displacement of the dial 140 and the rotary correction value of the carrier 116 so that the rotary motor 124 drives the carrier 116 to rotate at the rotary correction value correctly. Similarly, the second sensor 154 senses linear displacement of the scale 152 on the linear slider 148. There is a plurality of graduations on the scale 152. The second sensor 154 senses how many graduations the linear displacement of the scale 152 corresponds to and then output a corresponding signal to the feedback unit 144. The feedback unit 144 compares the linear displacement of the scale 152 sensed by the second sensor 154 with the radial correction value of the carrier 116 driven by the linear motor 126. If the linear displacement of the scale 152 corresponds with the radial correction value of the carrier 116, there is no need to correct the linear motor 126 anymore. If the linear displacement of the scale 152 does not correspond with the radial correction value of the carrier 116, the feedback unit 144 outputs the second feedback signal to the control unit 128 and thus the control unit 128 controls the linear motor 126 according to the second feedback signal. That is, the control unit 128 controls the linear motor 126 according to the difference between the linear displacement of the scale 152 and the radial correction value of the carrier 116 so that the linear motor 126 drives the carrier 116 to move at the radial correction value correctly.

In contrast to the prior art, the image stabilization apparatus in the embodiments of the present invention senses the horizontal displacement and the vertical displacement of the image sensor and then calculates the rotary correction value and the radial correction value according to the horizontal displacement, the vertical displacement, and the transformation relation of Cartesian Coordinates System and Polar Coordinates System for correcting the bias of the image sensor according to the rotary correction value and the radial correction value. The mechanism in the embodiments of the present invention utilizes less driving components (driving components in R and θ directions) for simply mechanical design. The slot on the transmission component in the embodiments of the present invention increases accuracy of the movement. In addition, the disclosure in the embodiments of the present invention solves the problem of residual magnetic force due to magnetic driving means in the prior art and increases accuracy of the correction with real-time feedback signals. The embodiments of the present invention disclose a simply and effective optical anti-vibration mechanism.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image stabilization apparatus for stabilizing an image sensor, the image stabilization apparatus comprising:
   a transmission component whereon a slot being formed;
   a rotary motor comprising:
      an annular rotor connected to the transmission component; and
      an annular stator disposed on a side of the annular rotor, the annular rotor being capable of rotating relative to the annular stator;
   a carrier for carrying the image sensor, the carrier comprising a shaft disposed inside the slot in a slidable manner; and
   a linear motor coupled to the transmission component and the shaft of the carrier for driving the carrier to slide inside the slot.

2. The image stabilization apparatus of claim 1 further comprising at least two fixing components for connecting the transmission component and the annular rotor.

3. The image stabilization apparatus of claim 2 wherein each fixing component comprises:
   a sheath;
   a plate;
   a first protrusion disposed on the plate for inserting inside a hole on an end of the transmission component; and
   a second protrusion disposed on the plate for passing through the sheath and inserting inside a hole on the annular rotor.

4. The image stabilization apparatus of claim 2 wherein each fixing component is a screw for screwing the transmission component and the annular rotor.

5. The image stabilization apparatus of claim 1 further comprising:
   a dial disposed on the annular rotor;
   a first sensor installed on the annular stator and located in a position corresponding to the dial for sensing a rotary displacement of the dial;
   a feedback unit for comparing a signal transmitted from the rotary motor with a signal transmitted from the first sensor so as to generate a first feedback signal; and
   a control unit for controlling the rotary motor according to the first feedback signal.

6. The image stabilization apparatus of claim 1 further comprising a positioning component disposed on the annular stator for positioning the carrier in an initial location.

7. The image stabilization apparatus of claim 6 wherein the positioning component is a magnet.

8. The image stabilization apparatus of claim 1 wherein the linear motor comprises:
   a linear slider sheathed outside the shaft; and
   a linear stator installed on a side of the slot of the transmission component for driving the linear slider to slide inside the slot.

9. The image stabilization apparatus of claim 8 further comprising:
   a scale disposed on the linear slider;
   a second sensor installed on the linear stator and located in a position corresponding to the scale for sensing a linear displacement of the scale;
   a feedback unit for comparing a signal transmitted from the linear motor with a signal transmitted from the second sensor so as to generate a second feedback signal; and
   a control unit for controlling the linear motor according to the second feedback signal.

10. The image stabilization apparatus of claim 1 further comprising:
    a horizontal sensor for sensing a horizontal displacement of the carrier;
    a vertical sensor for sensing a vertical displacement of the carrier;
    a calculating unit for calculating a rotary correction value and a radial correction value according to the horizontal displacement and the vertical displacement; and
    a control unit coupled to the calculating unit for controlling the rotary motor and the linear motor according to the rotary correction value and the radial correction value.

11. The image stabilization apparatus of claim 1 wherein the rotary motor is a supersonic rotary motor.

12. The image stabilization apparatus of claim 1 wherein the linear motor is a supersonic linear motor.

13. The image stabilization apparatus of claim 5 wherein the linear motor comprises:
    a linear slider sheathed outside the shaft; and
    a linear stator installed on a side of the slot of the transmission component for driving the linear slider to slide inside the slot.

14. The image stabilization apparatus of claim 13 further comprising:
    a scale disposed on the linear slider;
    a second sensor installed on the linear stator and located in a position corresponding to the scale for sensing a linear displacement of the scale;
    a feedback unit for comparing a signal transmitted from the linear motor with a signal transmitted from the second sensor so as to generate a second feedback signal; and
    a control unit for controlling the linear motor according to the second feedback signal.

15. The image stabilization apparatus of claim 14 further comprising:
    a horizontal sensor for sensing a horizontal displacement of the carrier;
    a vertical sensor for sensing a vertical displacement of the carrier;
    a calculating unit for calculating a rotary correction value and a radial correction value according to the horizontal displacement and the vertical displacement; and
    a control unit coupled to the calculating unit for controlling the rotary motor and the linear motor according to the rotary correction value and the radial correction value.

* * * * *